(12) United States Patent
Cho et al.

(10) Patent No.: US 8,995,781 B2
(45) Date of Patent: Mar. 31, 2015

(54) METHOD AND APPARATUS FOR DEBLURRING NON-UNIFORM MOTION BLUR USING MULTI-FRAME INCLUDING BLURRED IMAGE AND NOISE IMAGE

(71) Applicants: Samsung Electronics Co., Ltd., Suwon-si (KR); Postech Academy-Industry Foundation, Pohang-si (KR)

(72) Inventors: Jung Uk Cho, Hwaseong (KR); Seung Yong Lee, Pohang (KR); Young Su Moon, Seoul (KR); Shi Hwa Lee, Seoul (KR); Chi Young Lee, Pohang (KR); Sung Hyun Cho, Pohang (KR); Ho Jin Cho, Pohang (KR)

(73) Assignees: Samsung Electronics Co., Ltd., Suwon-Si (KR); Postech Academy-Industry Foundation, Pohang-Si (KR)

( * ) Notice: Subject to any disclaimer, the term of this patent is extended or adjusted under 35 U.S.C. 154(b) by 103 days.

(21) Appl. No.: 13/674,391

(22) Filed: Nov. 12, 2012

(65) Prior Publication Data
US 2013/0243346 A1 Sep. 19, 2013

(30) Foreign Application Priority Data

Mar. 13, 2012 (KR) ........................ 10-2012-0025622

(51) Int. Cl.
*G06K 9/40* (2006.01)
*G06T 5/00* (2006.01)
*G06T 5/50* (2006.01)

(52) U.S. Cl.
CPC . *G06T 5/003* (2013.01); *G06T 5/50* (2013.01); *G06T 2207/10016* (2013.01)
USPC .......................................... 382/254; 382/275

(58) Field of Classification Search
None
See application file for complete search history.

(56) References Cited

U.S. PATENT DOCUMENTS

| 7,317,445 | B2 | 1/2008 | Hekstra et al. |
| 7,463,296 | B2 * | 12/2008 | Sun et al. ...................... 348/254 |
| 7,773,115 | B2 * | 8/2010 | Estevez et al. ........... 348/208.13 |
| 8,238,694 | B2 * | 8/2012 | Sun et al. ...................... 382/294 |
| 8,532,421 | B2 * | 9/2013 | Wang et al. .................. 382/255 |

(Continued)

FOREIGN PATENT DOCUMENTS

| JP | 2003-75883 | 3/2003 |
| KE | 10-2006-0099351 | 9/2006 |

(Continued)

OTHER PUBLICATIONS

Cho, Sunghyun, Yasuyuki Matsushita, and Seungyong Lee. "Removing non-uniform motion blur from images." Computer Vision, 2007. ICCV 2007. IEEE 11th International Conference on. IEEE, 2007.*

(Continued)

*Primary Examiner* — Li Liu
(74) *Attorney, Agent, or Firm* — Staas & Halsey LLP (57) ABSTRACT

A method and apparatus for deblurring a non-uniform motion blur using a multi-frame including a blurred image and a noise image is provided. The apparatus may provide a clearer image by estimating non-uniform motion blur information of the blurred image using the multi-frame, and performing estimation of the non-uniform motion blur information and obtaining of a latent image iteratively, thereby improving accuracy for estimating the non-uniform motion blur information, and reducing a processing time.

27 Claims, 9 Drawing Sheets

(56) References Cited

U.S. PATENT DOCUMENTS

| | | | | |
|---|---|---|---|---|
| 2008/0240607 | A1* | 10/2008 | Sun et al. | 382/275 |
| 2011/0090352 | A1* | 4/2011 | Wang et al. | 348/208.6 |
| 2011/0102642 | A1* | 5/2011 | Wang et al. | 348/241 |
| 2011/0304687 | A1* | 12/2011 | Joshi et al. | 348/36 |
| 2013/0314568 | A1* | 11/2013 | Vranceanu et al. | 348/239 |
| 2013/0342738 | A1* | 12/2013 | Vranceanu | 348/242 |

FOREIGN PATENT DOCUMENTS

| | | |
|---|---|---|
| KR | 10-2006-0129972 | 12/2006 |
| KR | 10-2007-0059077 | 6/2007 |
| KR | 10-2007-0061157 | 6/2007 |
| KR | 10-0860967 | 9/2008 |
| KR | 10-2009-0057619 | 6/2009 |
| KR | 10-2010-0034500 | 4/2010 |
| KR | 10-2009-0100769 | 4/2011 |
| KR | 10-2011-0096426 | 8/2011 |

OTHER PUBLICATIONS

Whyte, Oliver, et al. "Non-uniform deblurring for shaken images." International journal of computer vision 98.2 (2012): 168-186.*

Levin, Anat. "Blind motion deblurring using image statistics." Advances in Neural Information Processing Systems. 2006.*

Y. Yitzhaky et al., "Direct method for restoration of motion-blurred images", Department of Electrical and Computer Engineering, Ben-Gurion University of Negev, J. Opt. Soc., vol. 15, No. 6, Jun. 1998, pp. 1512-1519.

Alex Rav-Acha et al., "Two motion-blurred images are better than one", School of Computer Science and Engineering, The Hebrew University of Jerusalem, Pattern Recognition Letters 26, 2005, pp. 311-317.

Lu Yuan et al., "Image Deblurring with Blurred/Noisy Image Pairs", The Hong Kong University of Science and Technology and Microsoft Research Asia, pp. 1-10.

Rob Fergus et al., "Removing Camera Shake from a Single Photograph", MIT CSAIL and University of Toronto, pp. 1-8.

Qi Shan et al., "High-quality Motion Deblurring from a Single Image", Department of Computer Science and Engineering, The Chinese University of Hong Kong and Adobe Systems, Inc., pp. 1-10.

Sunghyun Cho et al., "Fast Motion Deblurring", POSTECH, pp. 1-8.

Anat Levin et al., "Understanding and evaluating blind deconvolution algorithms" MIT CSAIL, Weizmann Institute of Science, Hebrew University, and Adobe, pp. 1-8.

Qi Shan et al., "Rotational Motion Deblurring of a Rigid Object from a Single Image", Department of Computer Science and Engineering, The Chinese University of Hong Kong, pp. 1-8.

Moshe Ben-Ezra et al., Computer Science Department, Columbia University, Proceedings of the 2003 IEEE Computer Science Society Conference on Computer Vision and Pattern Recognition, pp. 1-8.

* cited by examiner

METHOD AND APPARATUS FOR DEBLURRING NON-UNIFORM MOTION BLUR USING MULTI-FRAME INCLUDING BLURRED IMAGE AND NOISE IMAGE

CROSS-REFERENCE TO RELATED APPLICATIONS

This application claims the priority benefit of Korean Patent Application No. 10-2012-0025622, filed on Mar. 13, 2012, in the Korean Intellectual Property Office, the disclosure of which is incorporated herein by reference.

BACKGROUND

1. Field

One or more example embodiments relate to a method and apparatus for deblurring a non-uniform motion blur using a multi-frame including a blurred image and a noise image.

2. Description of the Related Art

A blur is a phenomenon which commonly occurs during a process of obtaining an image while using an apparatus for obtaining an image such as a camera. The blur phenomenon is one of the main contributors to deterioration of image quality.

When an image is obtained using a camera, and the like, in an environment where an amount of light is insufficient, for example, a dark indoor location or an outdoor location after sunset, a sufficient amount of light is required to obtain a clear, non-blurred image. Accordingly, an image sensor may need to be exposed to light for a longer period of time than usual in order to obtain a sufficient amount of light. However, when an exposure time is long, a blur may occur in the image due to the image sensor being shaken during the photographing process.

Removing a blur from an image may be difficult since the amount of information required may be greater than the amount of information obtained.

SUMMARY

The foregoing and/or other aspects are achieved by providing a method of deblurring a non-uniform motion blur, the method including receiving a multi-frame including a blurred image including a non-uniform motion blur, and a noise image in which a blur is absent, performing image brightness registration with respect to the blurred image and the noise image, using histogram matching for correcting a difference in exposure times, estimating non-uniform motion blur information of a blurred image generated by performing the image brightness registration, and obtaining a latent image by deblurring the non-uniform motion blur in the multi-frame, based on the estimated non-uniform motion blur image.

The performing of the image brightness registration may include removing noise from the noise image, and performing image brightness registration with respect to the blurred image and the noise image from which the noise has been removed.

The method may further include performing the estimating of the non-uniform motion blur information and the obtaining of the latent image, iteratively.

The performing iteratively may include performing the estimating of the non-uniform motion blur information and the obtaining of the latent image, iteratively, while changing a resolution of the blurred image generated by performing the image brightness registration.

The method may further include estimating non-uniform motion blur information of the noise image from which the noise has been removed, during a first iteration.

The method may further include updating the non-uniform motion blur information during each of a second iteration and subsequent iterations, using a latent image obtained during a previous iteration.

The obtaining of the latent image may include obtaining a final latent image that is restored from the multi-frame by applying the Richardson-Lucy (RL) deconvolution algorithm with respect to final non-uniform motion blur information obtained by the iterative performance, the blurred image including the non-uniform motion blur, and the noise image from which the noise has been removed.

The estimating of the non-uniform motion blur information may include estimating a homography for the blurred image on which the image brightness registration has been performed, and computing a weight for the homography, using the estimated homography.

The estimating of the homography and the computing of the weight may be performed a predetermined number of times, iteratively.

The obtaining of the latent image may include deblurring the non-uniform motion blur using a residual blurred image and a residual latent image based on the RL deconvolution algorithm.

The foregoing and/or other aspects are achieved by providing an apparatus for deblurring a non-uniform motion blur, the apparatus including a receiving unit to receive a multi-frame including a blurred image including a non-uniform motion blur, and a noise image in which a blur is absent, a performing unit to perform image brightness registration with respect to the blurred image and the noise image, using histogram matching for correcting a difference in exposure times, an estimating unit to estimate non-uniform motion blur information of a blurred image generated by performing the image brightness registration, and an obtaining unit to obtain a latent image by deblurring the non-uniform motion blur in the multi-frame, based on the estimated non-uniform motion blur image.

The performing unit may include noise removing device to remove noise from the noise image, and a performing device to perform image brightness registration with respect to the blurred image and the noise image from which the noise has been removed.

The apparatus may further include a control unit to perform the estimating of the non-uniform motion blur information and the obtaining of the latent image, iteratively.

The control unit may perform the estimating of the non-uniform motion blur information and the obtaining of the latent image, iteratively, while changing a resolution of the blurred image generated by performing the image brightness registration.

The control unit may estimate non-uniform motion blur information of the noise image from which the noise has been removed, during a first iteration.

The control unit may update the non-uniform motion blur information during each of a second iteration and subsequent iterations, using a latent image obtained during a previous iteration.

The obtaining unit may obtain a final latent image that is restored from the multi-frame by applying the Richardson-Lucy (RL) deconvolution algorithm with respect to final non-uniform motion blur information obtained by the iterative performance, the blurred image including the non-uniform motion blur, and the noise image from which the noise has been removed.

The estimating unit may include an estimating device to estimate a homography for the blurred image on which the image brightness registration has been performed, and a computing device to compute a weight for the homography, using the estimated homography.

The estimating of the homography by the estimating device and the computing of the weight by the computing device may be performed a predetermined number of times, iteratively.

The foregoing and/or other aspects are achieved by providing a method of deblurring a non-uniform motion blur. The method includes receiving a multi-frame comprising a blurred image including a non-uniform motion blur and a noise image, and obtaining a latent image having less motion blur than the blurred image by combining aspects of the blurred image and the noise image.

The foregoing and/or other aspects are achieved by providing a method of deblurring a non-uniform motion blur. The method includes performing image brightness registration with respect to a blurred image including a non-uniform motion blur and a noise image in which a blur is absent, using histogram matching for correcting a difference in exposure times, estimating non-uniform motion blur information of a blurred image generated by performing the image brightness registration, and obtaining a latent image by deblurring the non-uniform motion blur in the multi-frame, based on the estimated non-uniform motion blur image.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
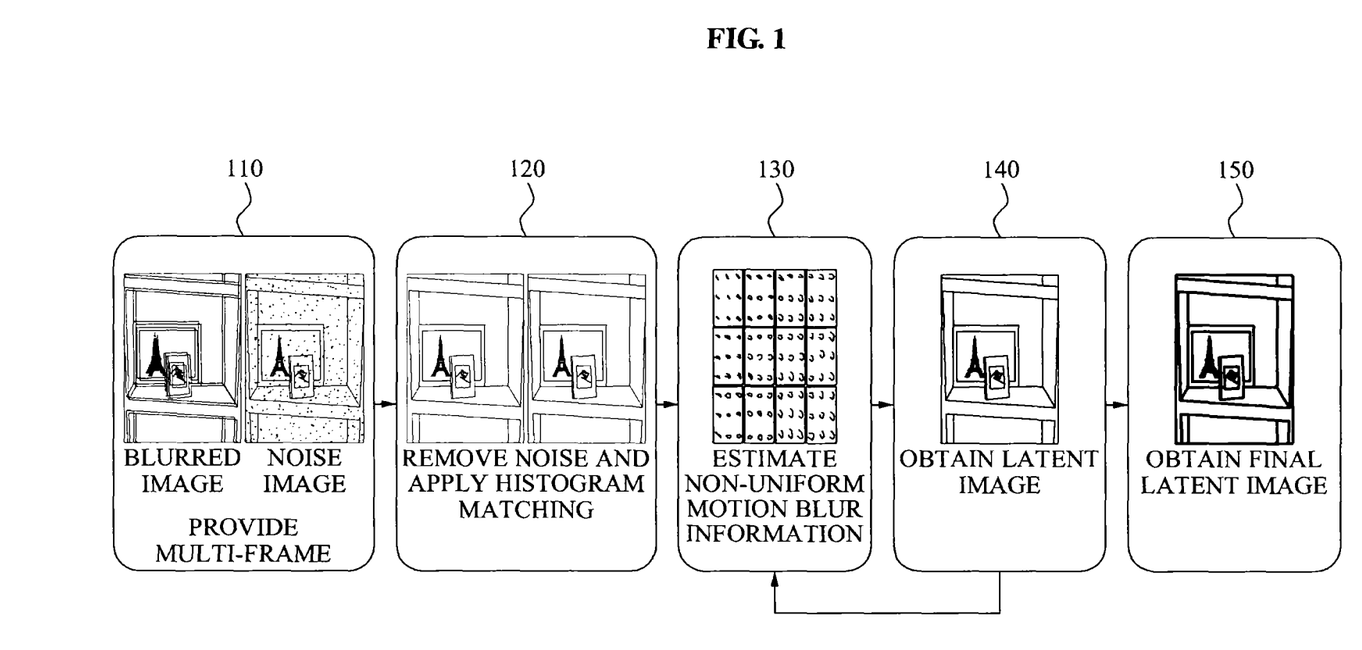
FIG. 1 illustrates a method of deblurring a non-uniform motion blur using a multi-frame including a blurred image and a noise image according to example embodiments.

FIG. 1 is provided to describe a method of deblurring a non-uniform motion blur using a multi-frame including a blurred image and a noise image according to example embodiments.

Referring to FIG. 1, in order to deblur the non-uniform motion blur using the multi-frame including the blurred image and the noise image, the multi-frame including the blurred image and the noise image may be provided in operation 110. In this instance, the blurred image may be obtained using a long exposure, and the noise image may be obtained using a short exposure and high International Organization for Standardization (ISO) sensitivity.

In operation 120, the noise image that is input in operation 110 may be processed.

That is, noise in the noise image included in the multi-frame may be removed, and histogram matching may be applied in order to correct a difference in exposure times between the blurred image and the noise image from which the noise has been removed.

In this instance, an edge-preserving noise removal scheme may be used depending on a type of the noise included in the noise image. During this process, although detailed information, for example, a texture, may be eliminated, a great portion of edge information may be preserved and may be used for homography estimation in operation 130. In operation 120, the noise may be removed from the noise image, and the noise image may be corrected to have a color similar to a color of the blurred image.

In operation 130, non-uniform motion blur information may be estimated using image registration. That is, the non-uniform motion blur information may be estimated by registering the blurred image included in the multi-frame and the image from which the noise has been removed in operation 120.

When the operations 130 and 140 are performed iteratively, non-uniform motion blur information of the blurred image may be estimated based on the image from which the noise has been removed, in a first iteration. However, from a second iteration, the non-uniform motion blur information of the blurred image may be estimated based on a latent image to be obtained during the operation 140, from which a non-uniform motion blur may be deblurred.

As a quantity of iterations increases, the estimated non-uniform motion blur information may converge to be similar to information of actual motion of a camera being shaken. Also, as the number of iterations increases, an obtained latent image to be used for estimating the non-uniform motion blur information, that is, an intermediate latent image, may become clearer. However, the obtained latent image, for example, the intermediate latent image, may be used for only the estimation of the non-uniform motion blur information, and may not have a direct effect on a final clear image to be restored in operation 150.

In operation 140, a clear image, that is, a latent image, may be obtained by applying the Richardson-Lucy (RL) deconvolution algorithm, based on the non-uniform motion blur information estimated in operation 130. The latent image restored in operation 140 may be provided as an input for the operation 130, by performing iterations of operations 130 and 140.

In the method of deblurring the non-uniform motion blur, accuracy of estimation and restoration may be improved by changing a resolution of an image using a multi-scale iterative processing scheme during the iterations of operations 130 and 140, for estimating the non-uniform motion blur information and obtaining the latent image, more effectively.

In the multi-scale iterative processing scheme, the non-uniform motion blur information may be estimated at a low resolution, at which blur information of a large scale motion blur may be estimated. Information of a blur occurring due to relatively small motion may be estimated at a high resolution by up-sampling the previous non-uniform motion blur information obtained through low resolution. When the multi-scale iterative processing scheme is used, a blur occurring due to a relatively great motion, which may be impossible to process using a single scale, may be estimated. Also, by estimating the relatively great motion first, a process rate may be expedited.

In operation 150, a final latent image may be restored. After final non-uniform motion blur information of the input blurred image is obtained through the iterations of operations 130 and 140, deconvolution may be performed using all of the finally estimated non-uniform motion blur information, the input blurred image including the non-uniform motion blur, and the noise image in which blur is absent, in order to obtain a final image from which the non-uniform motion blur has been deblurred, in operation 150. In an embodiment, the final image may also have less noise than the noise image. In this instance, the final latent image may be restored by performing the deconvolution for each color channel, for example, each of a red (R) channel, a green (G) channel, and a blue (B) channel, of the multi-frame, based on the estimated non-uniform motion blur information.

Hereinafter, a method of deblurring the non-uniform motion blur will be described in detail.

Generally, motion blur may be expressed by Equation 1.

$$B = K * L + N \qquad \text{[Equation 1]}$$

In Equation 1, B denotes a blurred image, and K denotes a point spread function (PSF) or a motion blur kernel indicating blur information of an image. L denotes a latent image, that is, a clear image in which a blur is absent. N denotes an unknown noise occurring during a process of obtaining an image, and * denotes a convolution operator.

Equation 1 may be expressed by Equation 2 in vectorial form.

$$b = \sum_i w_i T_i 1 + n \qquad \text{[Equation 2]}$$

In Equation 2, b, l, and n denote vector expressions of B, L, N of Equation 1. $T_i$ denotes a determinant representing a translational motion of a camera at a point in time $t_i$, and $w_i$ denotes a relative length of time when the camera stops at the point in time $t_i$, that is, an exposure time of the camera at the point in time $t_i$. Here, $\Sigma_i w_i = 1$.

Equation 2 may indicate that the blurred image b may be expressed using a sum of clear images I at each point on a route of the camera, that is, the determinant $T_i$. Here, Equation 1 and Equation 2 may express an identical model in different ways.

The clear images I may be computed using a motion blur model of Equation 1 or Equation 2. In this instance, since a blur model for estimating a clear image, that is, a latent image, may assume that all pixels included in an image may be uniformly moved, it may be difficult to deblur a non-uniform motion blur occurring due to a rotational motion, rather than a translational motion of a camera.

Accordingly, the non-uniform motion blur may be more effectively deblurred using another model that may express the non-uniform motion blur.

When shaking of a camera indicates a non-translational motion, it may be difficult to express a non-uniform motion blur in a form of Equation 1. Accordingly, another non-uniform motion blur model that describes a non-uniform motion blur effect of the camera may be derived by substituting $T_i$ of Equation 2 with a homography $P_i$, as expressed by Equation 3.

$$b = \sum_i w_i P_i 1 + n \qquad \text{[Equation 3]}$$

In the method of deblurring the non-uniform motion blur, blind motion deblurring may be performed by applying Equation 3.

Generally, in blind motion deblurring, the latent image I and the non-uniform motion blur information $P_i$ and $w_i$ may be computed based on the input blurred image b. However, according to example embodiments, a multi-frame including a blurred image and a noise image may be used. That is, the clear latent image I and the non-uniform motion blur information $P_i$ and $w_i$ may be computed finally, using both the input blurred image b, and an image $N_D$ obtained by removing noise from a noise image $I_N$.

In the method of deblurring the non-uniform motion blur, an operation of estimating non-uniform motion blur information and an operation of obtaining a latent image may be performed in order to obtain the non-uniform motion blur information $P_i$ and $w_i$ and the restored clear latent image I that may satisfy Equation 3, with respect to the blurred image included in the input multi-frame.

In this instance, the operation of estimating the non-uniform motion blur information and the operation of obtaining the latent image may be processed iteratively.

Accuracy of P and w indicating the non-uniform motion blur information may be progressively refined through the iterative process.

The final latent image may be obtained by deblurring the non-uniform motion blur in the blurred image, using final non-uniform motion blur information P and w obtained through the iterative process, the input blurred image b including the non-uniform motion blur, and the image $N_D$ obtained by removing noise from the noise image $I_N$ in which the non-uniform motion blur is absent.

In this instance, a method of obtaining the image $N_D$ by removing the noise from the noise image $I_N$ may not be limited, and any methods of removing noise may be used depending on the types of the noise included in the noise image $I_N$.

An intermediate latent image, estimated during an optimizing process of performing the process of estimating the non-uniform motion blur information and the process of obtaining the latent image, iteratively, may not have a direct effect on the final image from which the non-uniform motion blur is deblurred. That is, the intermediate latent image may have an effect on the estimation of the non-uniform motion blur information P and w, thereby affecting the final clear image from which the non-uniform motion blur is deblurred, indirectly.

The process of estimating the non-uniform motion blur information may be performed using image brightness registration. The process may include two processes: a process of estimating a homography P indicating the non-uniform motion blur; and a process of computing a weight w of the corresponding homography.

In the process of estimating the non-uniform motion blur information, when an intermediate latent image I is provided, a homography P indicating a non-uniform motion blur may be computed. In order to compute the homography P, Equation 3 may be rearranged to obtain Equation 4.

$$b - \sum_{j \neq i} w_j P_j 1 = w_i P_i 1 + n \qquad \text{[Equation 4]}$$

In the method of deblurring the non-uniform motion blur, in order to compute a single homography $P_i$ in Equation 4, the homography $P_i$ minimizing a difference between $$b - \sum_{j \neq i} w_j P_j 1$$

of the left side and $w_i P_i 1$ of the right side may be computed by applying an image brightness registration algorithm. In order to compute the entire homography set P, all homographies may be computed by selecting a homography $P_i$ one by one.

In computing the homography, when image brightness registration has been performed using the blurred image and the noise image, performing the image brightness registration may be difficult due to a difference in exposure times between the blurred image and the noise image. Accordingly, a tone value of the noise image may be changed to be similar to a tone value of the blurred image using a histogram matching scheme, and the image brightness registration may then be performed.

When the entire homography set P is computed, a weight w of a homography may be computed using the computed entire homography set P. In order to compute the weight w, Equation 3 may be expressed as Equation 5.

$$b = Lw + n \qquad \text{[Equation 5]}$$

In Equation 5, $L = [P_1 1 P_2 1 \ldots P_n 1]$, and L denotes an m-by-n (m×n) matrix. Here, m denotes a number of pixels included in an image, and n denotes a number of homographies.

Generally, m>>n, and the weight w in Equation 5 may need to have a value greater than or equal to '0.' Accordingly, a non-negative least square method may be used to compute the weight w. In order to use the non-negative least square method, Equation 5 may be expressed in a form of a normal equation, as shown in Equation 6.

The weight w may be computed using Equation 6.

$$w = (L^T L + \beta I)^{-1} L^T b \qquad \text{[Equation 6]}$$

In Equation 6, β denotes a normalized parameter to be used for resolving a case in which an inverse matrix of a determinant in parenthesis is absent. I denotes an identity matrix.

In the process of estimating the non-uniform motion blur information, an optimized homography P and weight w corresponding to a currently provided latent image I may be computed through the iterative performance using Equation 4 and Equation 6.

Here, an image $N_D$ from which noise has been removed may be used as the latent image I during a first iteration, and the non-uniform motion blur information may be updated during each of a second iteration and subsequent iterations, using a latent image obtained during a previous iteration.

The estimation of the non-uniform motion blur information P and w may be performed iteratively each time the latent image I is updated. Through the iterative process, the optimized latent image I and the non-uniform motion blur image P and w corresponding to the optimized latent image I may be computed.

In the process of obtaining the latent image, a latent image I may be computed based on the estimated non-uniform motion blur information P and w, the input blurred image b, and the input noise image $I_N$.

The latent image I may be expressed by a sum of the image $N_D$ from which the noise has been removed, and a residual latent image Δl including original clear edge information, as expressed by Equation 7.

$$l = N_D + \Delta l \qquad \text{[Equation 7]}$$

In Equation 7, the residual latent image Δl denotes clear information of an image that may disappear during a process of removing the noise. Using Equation 3 and Equation 7, a non-uniform motion blur Δb in the residual latent image Δl may be expressed by Equation 8.

$$\Delta b = \sum_i w_i P_i \Delta 1 + n \qquad \text{[Equation 8]}$$

The residual latent image Δl may be computed in order to resolve Equation 8. The Richardson-Lucy (RL) deconvolution algorithm expanded suitably for the non-uniform motion blur may be used to compute the residual latent image Δl.

A ringing artifact that may cause deterioration of image quality may be reduced by performing the deconvolution on the residual latent image.

A latent image Δl may be computed, during each iteration, using Equation 9.

$$\Delta l_{n+1} = \left( \sum_i w_i P_i^T \frac{\Delta B + 1}{\sum_i w_i P_i (\Delta l_n + 1)} \right) \cdot (\Delta l_n + 1) - 1 \qquad \text{[Equation 9]}$$

In Equation 9, $P^T$ denotes a homography transformed by applying a homography P inversely.

The final clear image I may be obtained by adding the image $N_D$ from which the noise has been removed and the residual latent image Δl is obtained by resolving Equation 9.

However, the residual latent image Δl obtained as a result of resolving Equation 9 may include a clear image and a little ringing artifact. That is, the ringing artifact may be reduced, however, may not be eliminated completely.

Accordingly, a more refined Gain-Controlled RL deconvolution algorithm may be used. A residual latent image Δl obtained by iterative performance of the Gain-Controlled RL deconvolution may be computed, using Equation 10.

$$\Delta l_{n+1} = \qquad \text{[Equation 10]}$$
$$1_{gain} \cdot \left\{ \left( \sum_i w_i P_i^T \frac{\Delta B + 1}{\sum_i w_i P_i (\Delta l_n + 1)} \right) \cdot (\Delta l_n + 1) - 1 \right\}$$

In Equation 10, $I_{gain}$ may be obtained, as expressed by Equation 11.

$$1_{gain} = (1 - \alpha) + \alpha \sum_l \|\nabla N_D^l\| \qquad \text{[Equation 11]}$$

In Equation 11, α denotes a variable for controlling an effect of a gain map. $\nabla N_D^l$ denotes an image of a first stage in a pyramid when a gradient of an image from which noise has been removed is blurred using a Gaussian pyramid with a standard deviation of 0.5.

Although a value of α in Equation 11 may correspond to a predetermined value between 0 and 1, a value of 0.2 may be generally used.

As a result of the Gain-Controlled RL deconvolution of Equation 10, a smoother resulting image may be obtained when compared to the RL deconvolution of Equation 9, and the resulting image may be used to remove any ringing artifacts.

The result of Equation 9 and the result of Equation 10 may be complementarily used with each other. An image mainly including only a ringing artifact may be obtained by applying both the result of the RL deconvolution of Equation 9 and the result of the Gain-Controlled RL deconvolution of Equation 10 to a joint bilateral filter. A clear residual latent image in which the ringing artifact is absent may be obtained by subtracting the image mainly including only the ringing artifact from the result of the RL deconvolution of Equation 9. A final clear latent image may be obtained by adding the residual latent image in which the ringing artifact is absent to the result of the Gain-Controlled RL deconvolution of Equation 10.

Figure 2:
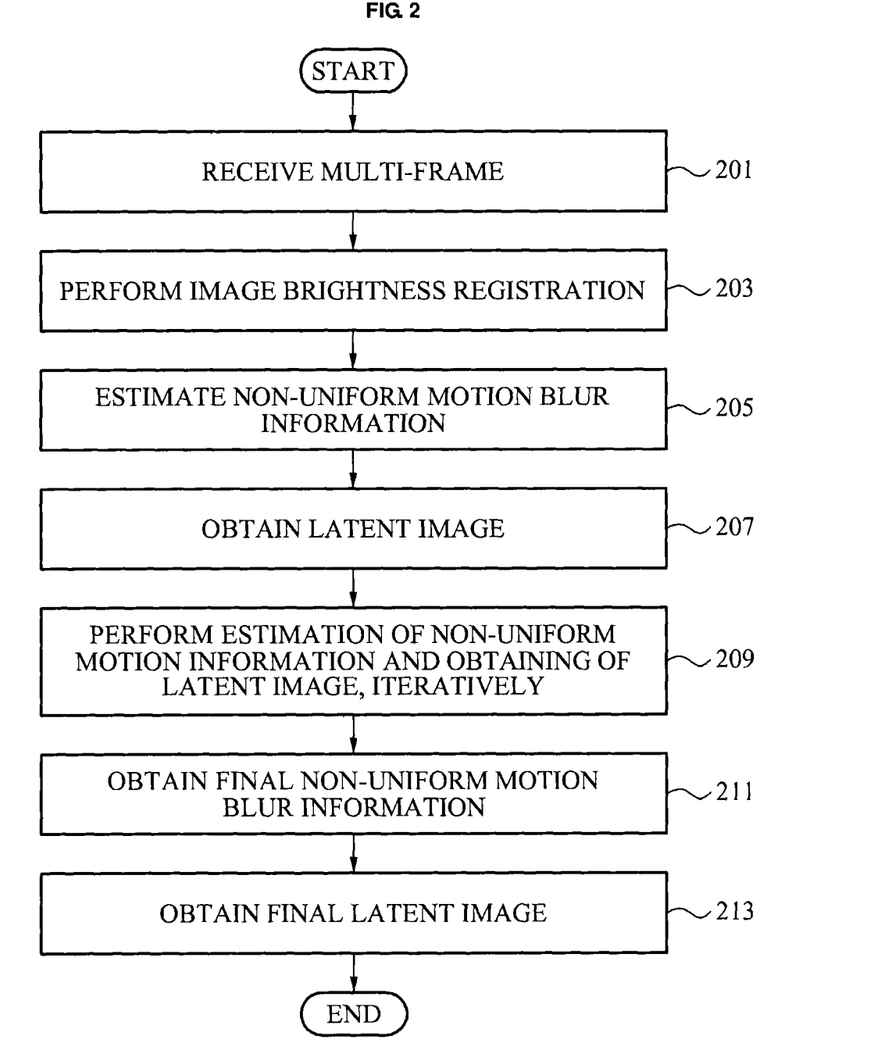
FIG. 2 illustrates a method of deblurring a non-uniform motion blur using a multi-frame including a blurred image and a noise image according to example embodiments.

FIG. 2 illustrates a method of deblurring a non-uniform motion blur using a multi-frame including a blurred image and a noise image according to example embodiments.

Referring to FIG. 2, an apparatus for deblurring a non-uniform motion blur, hereinafter referred to as a deblurring apparatus, may receive a multi-frame including a blurred image including a non-uniform motion blur, and a noise image in which a blur is absent, in operation 201.

In operation 203, the deblurring apparatus may perform image brightness registration with respect to the blurred image and the noise image, using histogram matching for correcting a difference in exposure times.

In this instance, the deblurring apparatus may remove noise from the noise image, and may perform the image brightness registration with respect to the blurred image and the noise image from which the noise has been removed.

In operation 205, the deblurring apparatus may estimate non-uniform motion blur information of a blurred image generated by performing the image brightness registration.

In this instance, in order to estimate the non-uniform motion blur information, the deblurring apparatus may estimate a homography for the blurred image on which the image brightness registration has been performed, and may compute a weight for the homography, based on the estimated homography. The process of estimating the homography and the process of computing the weight may be performed a predetermined number of times, iteratively, or may be performed until a change in an error value about a homography set including estimated homographies is less than a predetermined level or threshold.

In operation 207, the deblurring apparatus may obtain a latent image by deblurring the non-uniform motion blur in the multi-frame, based on the estimated non-uniform motion blur information. The deblurring apparatus may deblur the non-uniform motion blur using a residual blurred image and a residual latent image based on the RL deconvolution algorithm, by subsequent iterative performance.

In operation 209, the deblurring apparatus may perform both operation 205 of estimating the non-uniform motion blur information and operation 207 of obtaining the latent image, iteratively. In this instance, operation 209 may be performed iteratively while changing a resolution of the blurred image generated by performing image brightness registration by a multi-scale processing scheme.

In this instance, non-uniform motion blur information of the noise image from which the noise has been removed may be estimated during a first iteration. In addition, the non-uniform motion blur information may be updated during each of a second iteration and subsequent iterations, using a latent image obtained during a previous iteration.

In operation 211, the deblurring apparatus may obtain final non-uniform motion blur information by the iterative performance.

In operation 213, the deblurring apparatus may obtain a final latent image that is restored from the multi-frame, by applying the RL deconvolution algorithm with respect to the final non-uniform motion blur information, the blurred image including the non-uniform motion blur, and the noise image from which the noise has been removed.

Hereinafter, intermediate images for each operation of the method of deblurring the non-uniform motion blur using the multi-frame including the blurred image and the noise image will be described with reference to FIGS. 3 through 8.

Figure 3:
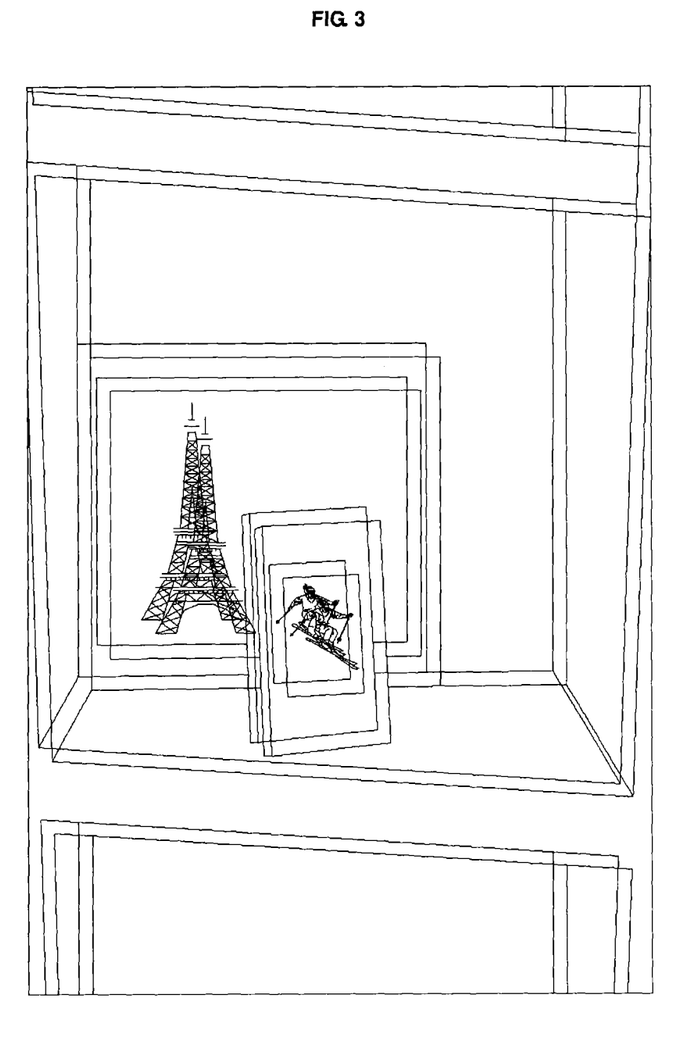
FIG. 3 illustrates a blurred image constituting a multi-frame according to example embodiments.
Figure 4:
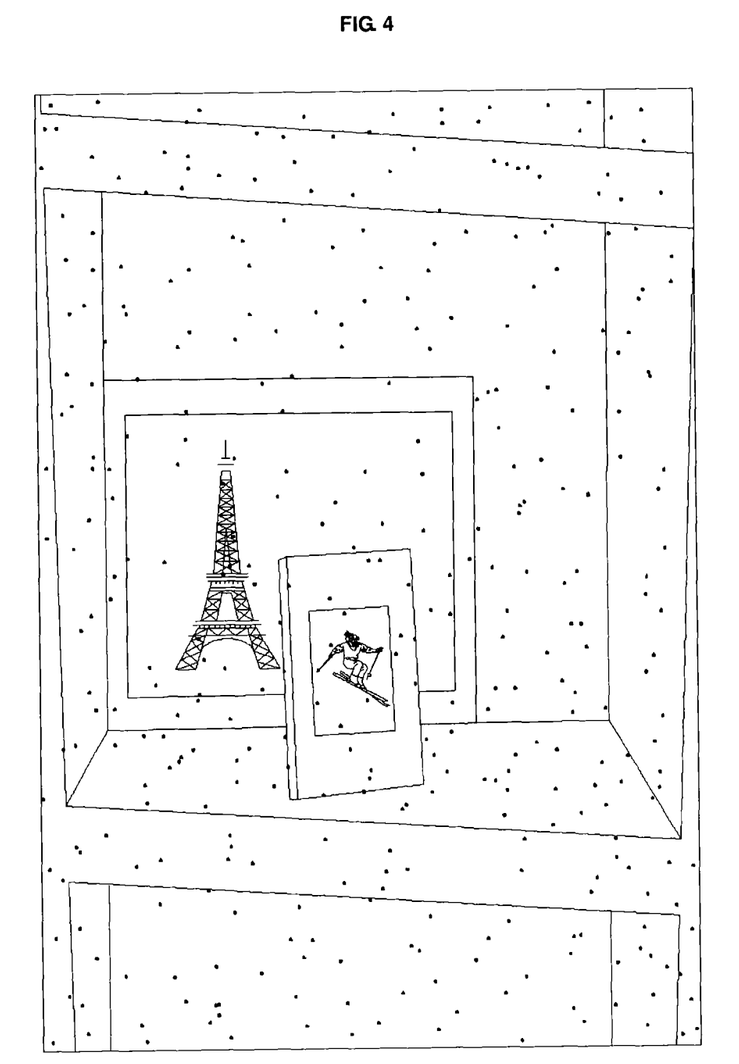
FIG. 4 illustrates a noise image constituting a multi-frame according to example embodiments.

FIG. 3 illustrates a blurred image including a non-uniform motion blur, that constitutes a multi-frame according to example embodiments, and FIG. 4 illustrates a noise image in which a blur is absent, that constitutes a multi-frame according to example embodiments. In an embodiment, the blurred image including a non-uniform motion blur of FIG. 3 and the noise image of FIG. 4 may constitute the same multi-view frame.

Figure 5:
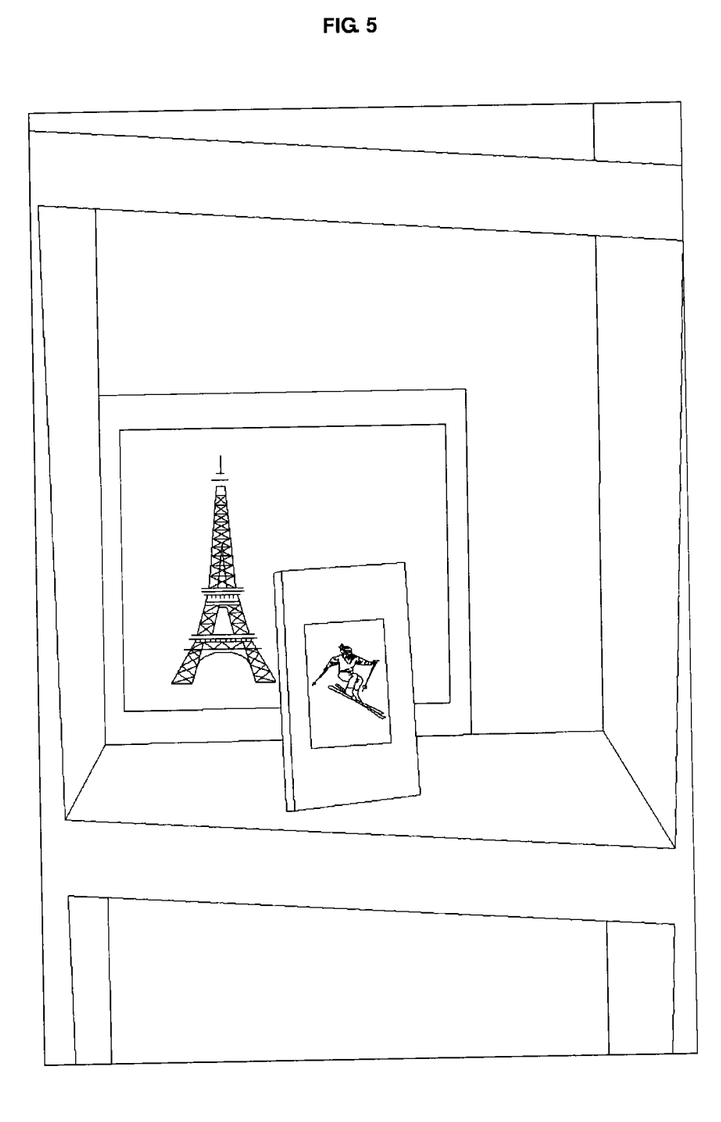
FIG. 5 illustrates a grayscale image of the blurred image of FIG. 3.
Figure 6:
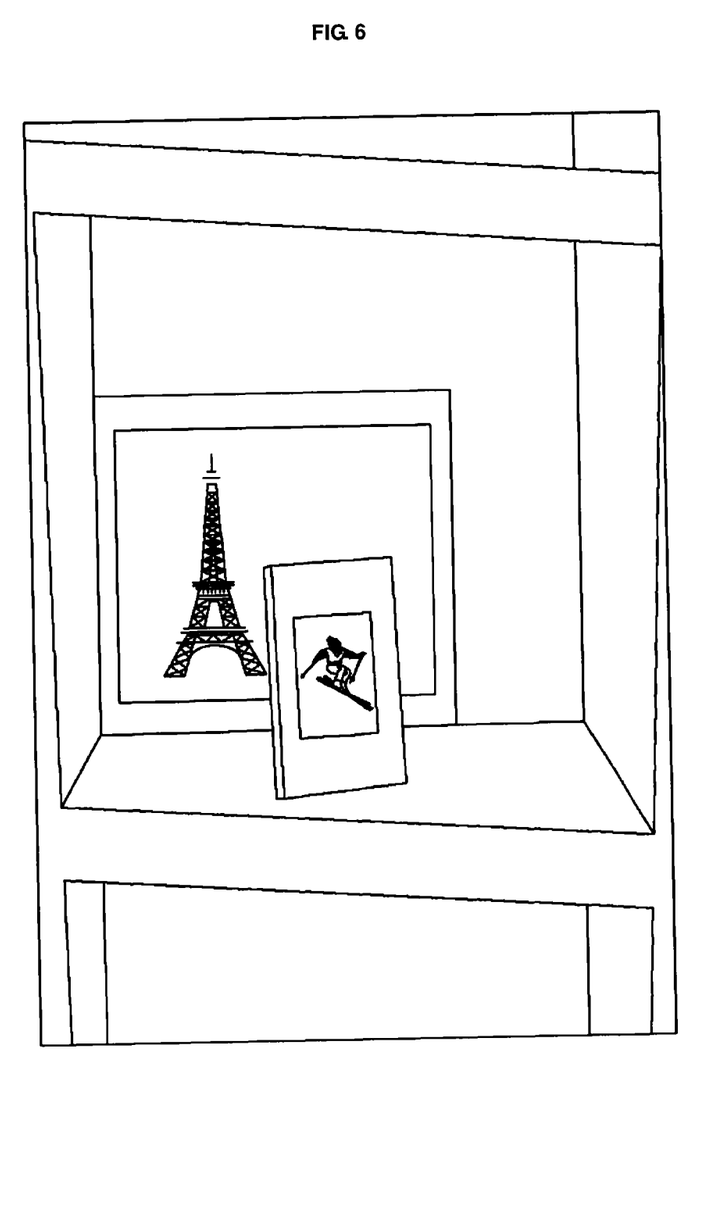
FIG. 6 illustrates a result of performing histogram matching with respect to a blurred image and the noise image of FIG. 4 after noise has been removed from the noise image, according to exemplary embodiments.

FIG. 5 illustrates a grayscale image of the blurred image of FIG. 3, and FIG. 6 illustrates a grayscale image of an image obtained by removing noise from the noise image of FIG. 4.

Figure 7:
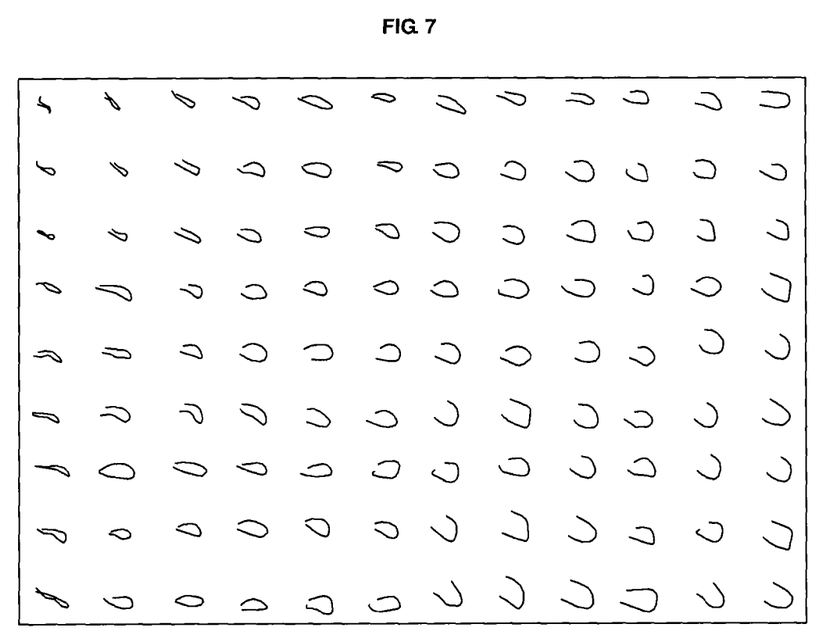
FIG. 7 illustrates a non-uniform motion blur estimated by a method of deblurring a non-uniform motion blur according to example embodiments.
Figure 8:
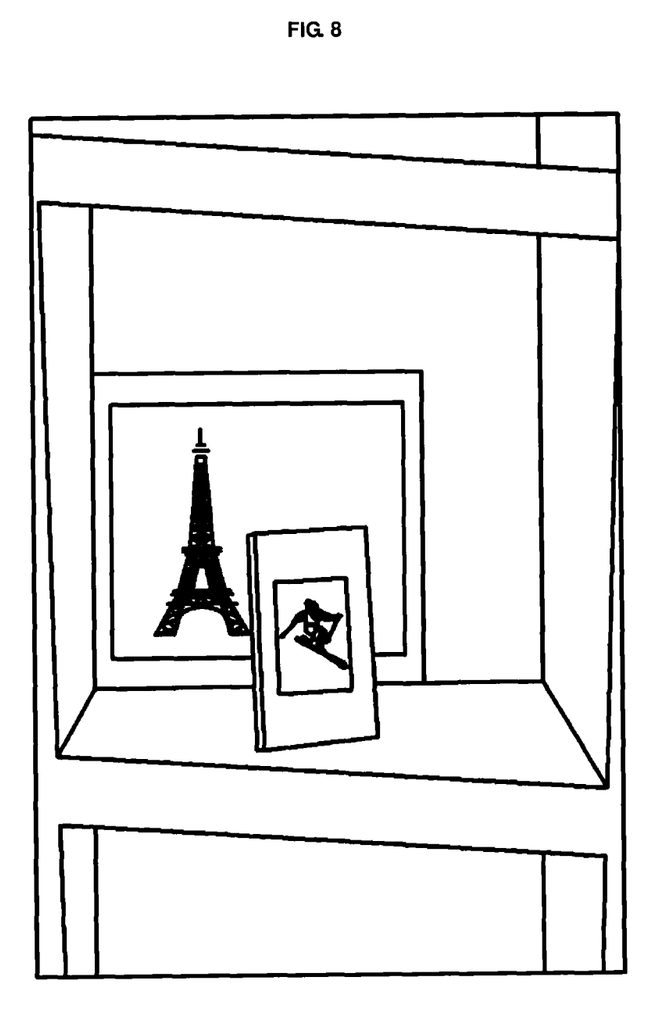
FIG. 8 illustrates a result of deblurring a non-uniform motion blur using a method of deblurring a non-uniform motion blur according to example embodiments.

FIG. 7 illustrates a non-uniform motion blur in the blurred image of FIG. 3 estimated using FIGS. 5 and 6, and FIG. 8 illustrates a final latent image from which a blur is deblurred using non-uniform motion blur information estimated in FIG. 7.

According to example embodiments, the final latent image from which the blur is deblurred may be restored, using two types of images, that is, the blurred image and the noise image, complementarily.

Figure 9:
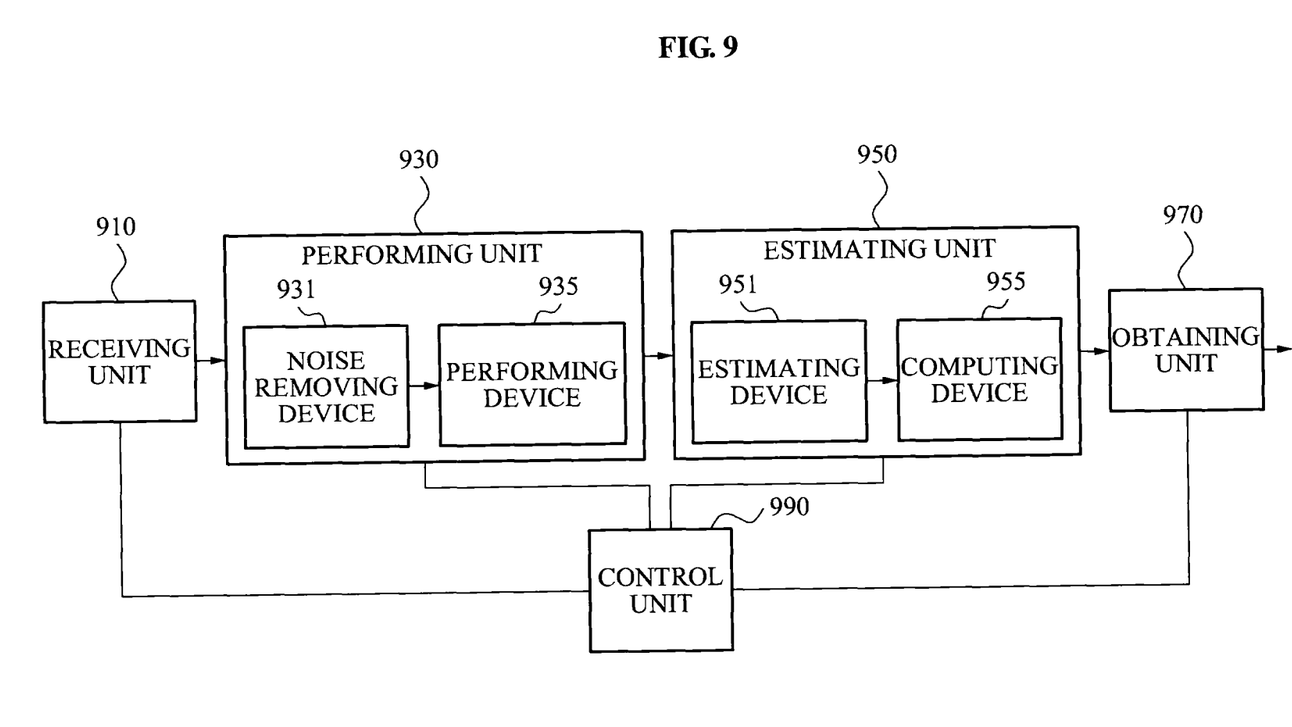
FIG. 9 illustrates an apparatus for deblurring a non-uniform motion blur using a multi-frame including a blurred image and a noise image according to example embodiments.

FIG. 9 illustrates an apparatus for deblurring a non-uniform motion blur using a multi-frame including a blurred image and a noise image according to example embodiments.

The deblurring apparatus may include, for example, a receiving unit 910, a performing unit 930, an estimating unit 950, an obtaining unit 970, and a control unit 990.

The receiving unit 910 may receive a multi-frame including a blurred image including a non-uniform motion blur and a noise image in which a blur is absent.

The performing unit 930 may perform image brightness registration with respect to the blurred image and the noise image using histogram matching for correcting a difference in exposure times. The performing unit 930 may include a noise removing device 931, and a performing device 935.

The noise removing unit 931 may remove noise from the noise image.

The performing device 935 may perform the image brightness registration with respect to the blurred image and the noise image from which the noise has been removed.

The estimating unit 950 may estimate non-uniform motion blur information of a blurred image generated by performing the image brightness registration. The estimating unit 950 may include, for example, an estimating device 951 and a computing device 955.

The estimating device 951 may estimate a homography for the blurred image on which the image brightness registration has been performed.

The computing device 955 may compute a weight for the homography, based on the estimated homography.

In this instance, the estimation of the homography by the estimating device 951 and the computation of the weight by the computing device 955 may be performed a predetermined number of times, iteratively, or may be performed until a change in an error value about a homography set including estimated homographies is less than a predetermined level or threshold.

The obtaining unit 970 may obtain a latent image by deblurring the non-uniform motion blur in the multi-frame, based on the estimated non-uniform motion blur information.

Here, the obtaining unit 970 may obtain a final latent image that is restored from the multi-frame, by applying the RL deconvolution algorithm with respect to final non-uniform motion blur information obtained by subsequent iterative performances, the blurred image including the non-uniform motion blur and the noise image from which the noise has been removed.

The control unit 990 may perform the estimation of the non-uniform motion blur information by the estimating unit 950 and the obtaining of the latent image by the obtaining unit 970, iteratively.

The control unit 990 may perform the estimation of the non-uniform motion blur information and the obtaining of the latent image, iteratively, while changing a resolution of the blurred image generated by performing image brightness registration.

In this instance, the control unit 990 may estimate non-uniform motion blur information of the noise image from which the noise has been removed during a first iteration. In addition, the control unit 990 may update the non-uniform motion blur information during each of a second iteration and subsequent iterations, using a latent image obtained during a previous iteration.

According to example embodiments, a clearer image may be estimated accurately and rapidly by estimating non-uniform motion blur information of a blurred image, using a multi-frame including the blurred image and a noise image.

According to example embodiments, accuracy for estimating non-uniform motion blur information may be improved by performing estimation of the non-uniform motion blur information and obtaining a latent image, iteratively.

The methods according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules described herein may be executed by a dedicated processor unique to that unit or by a processor common to one or more of the modules. The described methods may be executed on a general purpose computer or processor or may be executed on a particular machine such as the apparatus for deblurring a non-uniform motion blur described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method of deblurring a non-uniform motion blur, the method comprising:
   receiving a multi-frame comprising a blurred image including a non-uniform motion blur resulting from motion other than a translational motion, and a noise image in which a blur is absent;
   performing image brightness registration with respect to the blurred image and the noise image using histogram matching for correcting a difference in exposure times;
   estimating non-uniform motion blur information of a blurred image generated by performing the image brightness registration; and
   obtaining a latent image by deblurring the non-uniform motion blur in the multi-frame, based on the estimated non-uniform motion blur information.

2. The method of claim 1, wherein the performing of the image brightness registration comprises:
   removing noise from the noise image; and
   performing image brightness registration with respect to the blurred image and the noise image from which the noise has been removed.

3. The method of claim 2, further comprising:
   performing the estimating of the non-uniform motion blur information and the obtaining of the latent image, iteratively.

4. The method of claim 3, wherein the performing of the estimating iteratively comprises performing the estimating of the non-uniform motion blur information and the obtaining of the latent image, iteratively, while changing a resolution of the blurred image generated by performing the image brightness registration.

5. The method of claim 3, further comprising:
   estimating the non-uniform motion blur information of the noise image from which the noise has been removed during a first iteration.

6. The method of claim 3, further comprising:
   updating the non-uniform motion blur information during each of a second iteration and subsequent iterations using a latent image obtained during a previous iteration.

7. The method of claim 3, wherein the obtaining of the latent image comprises obtaining a final latent image that is restored from the multi-frame by applying the Richardson-Lucy (RL) deconvolution algorithm with respect to final non-uniform motion blur information obtained by the performing of the estimating iteratively, the blurred image including the non-uniform motion blur, and the noise image from which the noise has been removed.

8. The method of claim 1, wherein the estimating of the non-uniform motion blur information comprises:
   estimating a homography for the blurred image on which the image brightness registration has been performed; and computing a weight for the homography, using the estimated homography.

9. The method of claim 8, wherein the estimating of the homography and the computing of the weight are performed a predetermined number of times, iteratively.

10. The method of claim 1, wherein the obtaining of the latent image comprises deblurring the non-uniform motion blur using a residual blurred image and a residual latent image based on the RL deconvolution algorithm.

11. A non-transitory computer-readable medium comprising a program for instructing a computer to perform the method of claim 1.

12. The method of claim 1, wherein the latent image has less motion blur than the blurred image and the latent image has less noise than the noise image.

13. An apparatus for deblurring a non-uniform motion blur, the apparatus comprising:
   a processor to control one or more processor-executable units;
   a receiving unit to receive a multi-frame comprising a blurred image including a non-uniform motion blur resulting from motion other than a translational motion, and a noise image in which a blur is absent;
   a performing unit to perform image brightness registration with respect to the blurred image and the noise image using histogram matching for correcting a difference in exposure times;
   an estimating unit to estimate non-uniform motion blur information of a blurred image generated by performing the image brightness registration; and
   an obtaining unit to obtain a latent image by deblurring the non-uniform motion blur in the multi-frame, based on the estimated non-uniform motion blur information.

14. The apparatus of claim 13, wherein the performing unit comprises:
   a noise removing device to remove noise from the noise image; and
   a performing device to perform image brightness registration with respect to the blurred image and the noise image from which the noise has been removed.

15. The apparatus of claim 14, further comprising:
   a control unit to perform the estimating of the non-uniform motion blur information and the obtaining of the latent image, iteratively.

16. The apparatus of claim 15, wherein the control unit performs the estimating of the non-uniform motion blur information and the obtaining of the latent image, iteratively, while changing a resolution of the blurred image generated by performing the image brightness registration.

17. The apparatus of claim 15, wherein the control unit estimates non-uniform motion blur information of the noise image from which the noise has been removed, during a first iteration.

18. The apparatus of claim 15, wherein the control unit updates the non-uniform motion blur information during each of a second iteration and subsequent iterations using a latent image obtained during a previous iteration.

19. The apparatus of claim 15, wherein the obtaining unit obtains a final latent image that is restored from the multi-frame by applying the Richardson-Lucy (RL) deconvolution algorithm with respect to final non-uniform motion blur information obtained by the performing of the estimating iteratively, the blurred image including the non-uniform motion blur, and the noise image from which the noise has been removed.

20. The apparatus of claim 13, wherein the estimating unit comprises:
   an estimating device to estimate a homography for the blurred image on which the image brightness registration has been performed; and
   a computing device to compute a weight for the homography, using the estimated homography.

21. The apparatus of claim 20, wherein the estimating of the homography by the estimating device and the computing of the weight by the computing device are performed a predetermined number of times, iteratively.

22. The apparatus of claim 13, wherein the latent image has less motion blur than the blurred image and the latent image has less noise than the noise image.

23. A method of deblurring a non-uniform motion blur, the method comprising:
   receiving a multi-frame comprising a blurred image including a non-uniform motion blur resulting from motion other than a translational motion, and a noise image;
   performing image brightness registration with respect to the blurred image and the noise image using histogram matching to correct a difference in exposure times;
   estimating non-uniform motion blur information of a blurred image generated by performing the image brightness registration by estimating a homography for the blurred image on which the image brightness registration has been performed and computing a weight for the homography using the estimated homography; and
   obtaining a latent image having less motion blur than the blurred image by deblurring the non-uniform motion blur in the multi-frame based on the estimated non-uniform motion blur information including the estimated homography and the computed weight.

24. The method of claim 23, wherein the blurred image is obtained using a relatively long exposure time and the noise image is obtained using a relatively short exposure time.

25. The method of claim 24, wherein the latent image has less noise than the noise image.

26. The method of claim 23, wherein the estimating of the homography for the blurred image and the computing of the weight for the homography are iteratively performed a predetermined number of times.

27. The method of claim 23, wherein the estimating of the homography for the blurred image and the computing of the weight for the homography are iteratively performed until a change in error value of a homography set is less than a predetermined threshold.

* * * * *